(12) United States Patent
Rexhepi

(10) Patent No.: US 9,049,626 B2
(45) Date of Patent: *Jun. 2, 2015

(54) METHODS AND APPARATUS FOR RELIABLE INTER RADIO ACCESS NETWORK HANDOVER

(71) Applicant: NOKIA CORPORATION, Espoo (FI)

(72) Inventor: Vlora Rexhepi, Den Hoorn (NL)

(73) Assignee: NOKIA CORPORATION, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,876

(22) Filed: Aug. 25, 2014

(65) Prior Publication Data

US 2014/0362828 A1 Dec. 11, 2014

Related U.S. Application Data

(63) Continuation of application No. 12/710,908, filed on Feb. 23, 2010, now Pat. No. 8,817,744.

(51) Int. Cl.
*H04W 4/00* (2009.01)
*H04W 36/00* (2009.01)

(52) U.S. Cl.
CPC .......... *H04W 36/0033* (2013.01); *H04W 36/00* (2013.01); *H04W 36/0022* (2013.01)

(58) Field of Classification Search
CPC .................................................. H04W 36/00

USPC ......... 370/328–338, 310, 349–350, 325–327, 370/466–473; 455/436–460
See application file for complete search history.

(56) References Cited

U.S. PATENT DOCUMENTS

| 8,023,491 B2* | 9/2011 | Gruber .......................... 370/349 |
| 2010/0113024 A1 | 5/2010 | Wu |
| 2011/0310844 A1* | 12/2011 | Rexhepi ........................ 370/331 |

* cited by examiner

*Primary Examiner* — Ngo Ricky
*Assistant Examiner* — Iqbal Zaidi
(74) *Attorney, Agent, or Firm* — Squire Patton Boggs (US) LLP

(57) ABSTRACT

In accordance with an example embodiment of the present invention, a method comprises receiving at a first network node an inter-radio access technology (RAT) signaling message from a source node, a handover signaling message including inter-RAT handover information including a START packet switched (START PS) value; determining whether the START PS value is reliable prior to handing over to a second network node at least based in part on the source node from which the START PS value is received and inter-RAT handover information reliability indicator; building an inter-RAT handover information reliability indicator to indicate whether the START PS value is reliable and including the inter-RAT handover info reliability indicator in a second signaling message; and forwarding the second signaling message to the second network node.

19 Claims, 5 Drawing Sheets

METHODS AND APPARATUS FOR RELIABLE INTER RADIO ACCESS NETWORK HANDOVER

CROSS REFERENCE TO RELATED APPLICATION

This is a Continuation of U.S. patent application Ser. No. 12/710,908 filed Feb. 23, 2010. The content of that application is hereby incorporated by reference in its entirety.

TECHNICAL FIELD

The present application relates generally to method and apparatus for reliable inter radio access technology handover.

BACKGROUND

It is common to have a wireless mobile station to roam from one wireless network to another wireless network of a different wireless technology. For example, a mobile station often roams from a third generation (3G) network such as a Universal Mobile Telecommunication System (UMTS) network to a second generation (2G) network or vice versa. Part of the handover of the mobile station from one network to a target network is to ensure the security of the signaling and data when they reach the target network, in particular when the target network is a UMTS network. The security is achieved by the exchange of the security parameters between the network and the mobile station needed for ciphering and integrity protection of signaling and data radio bearer in a connected mode.

An inter-radio access technology (RAT) handover information includes a start packet switched (START PS) value, an UMTS security parameter associated with the mobile station that is used in the UMTS networks in packet switched domain. Different networks may have different methods of obtaining the inter-RAT handover information including the START PS value. For example, a long-term evolution (LTE) network node may obtain the START PS value by querying the mobile station for the inter-RAT handover information including the START PS value when the mobile station roams into the LTE network, which is generated by the mobile station. On the other hand, a 2G network node such as a Global System for Mobile communications (GSM) network node may pass a received inter-RAT handover information including the START PS value to a next GSM network node.

SUMMARY

Various aspects of examples of the invention are set out in the claims.

According to a first aspect of the present invention, a method comprises receiving at a first network node an inter-radio access technology (RAT) signaling message from a source network node, the inter-RAT signaling message including inter-RAT handover information including a START packet switched (START PS) value; determining whether the START PS value is reliable prior to handing over to a second network node at least based in part on the source node from which the START PS value is received and inter-RAT handover information reliability indicator; building an inter-RAT handover information reliability indicator to indicate whether the START PS value is reliable and including the inter-RAT handover info reliability indicator in a second inter-RAT signaling message; and forwarding the second inter-RAT signaling message to the second network node.

According to a second aspect of the present invention, an apparatus comprises an interface module configured to receive at a first network node an inter-radio access technology (RAT) signaling message from a source network node, the inter-RAT signaling message including a packet switched (PS) value; and forwarding a second inter-RAT signaling message including an inter-RAT handover information reliability indicator to a second network node. The apparatus also comprises a handover module configured to determine whether the START PS value is reliable prior to handing over to the second network node based on the source node from which the START PS value is received, build the inter-RAT handover information reliability indicator indicating whether the START PS value is reliable and include the inter-RAT handover START PS value reliability indicator in the second inter-RAT signaling message.

According to a third aspect of the present invention, an apparatus comprises at least one processor; and at least one memory including computer program code the at least one memory and the computer program code configured to receive at a first network node an inter-radio access technology (RAT) signaling message from a source network node, the inter-RAT signaling message including a START packet switched (START PS) value. The computer program code is further configured to determine whether the START PS value is reliable prior to handing off to a second network node based on a source node from which the START PS value is received; build an inter-RAT handover information reliability indicator indicating whether the START PS value is reliable and include the inter-RAT handover information reliability indicator in a second inter-RAT signaling message; and forward the second inter-RAT signaling message to the second network node.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Different ways of obtaining the START PS value for handover of a mobile station from a 3G network node to a 2G network node may cause inconsistent START PS values to be passed between network nodes. For example, a START PS value stored in the mobile station may become inconsistent with the START PS value received in a radio network controller (RNC) during a handover if the inter—RAT handover information including the START PS value is passed from a UMTS network node to a GSM network node and thereafter passed to the radio network controller in the UMTS network. This may cause the connection failure due to which no signaling or data is transferred between the mobile station and the radio network controller. One solution for dealing with this issue is to determine at a 2G network node whether or not a START PS value is reliable according to the source node and by means of an indicator. An indicator, an inter-RAT handover information reliability indicator for example, may be created and included in an handover signaling message to indicate to a next receiving node whether the START PS value is reliable. A 2G network node may rely on the value of the inter-RAT handover information reliability indicator to determine whether the received START PS value is reliable. START PS value is considered not reliable if the source node is the radio network controller in UMTS.

An example embodiment of the present invention and its potential advantages are understood by referring to FIGS. 1 through 5 of the drawings.

Figure 1:
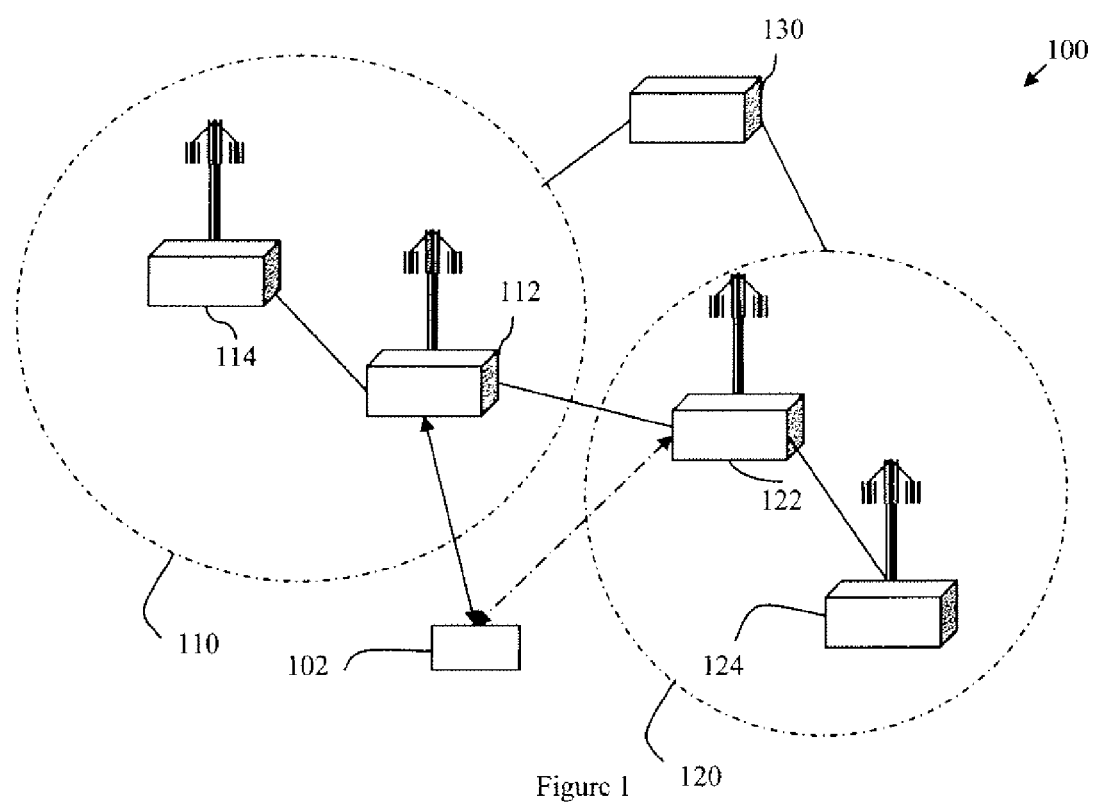
FIG. 1 illustrates an example wireless network.

FIG. 1 illustrates an example wireless system 100. The example wireless system 100 includes a first wireless network 110 and a second wireless network 120. In one example embodiment, the first wireless network 110 is a UMTS network, and the second wireless network 120 is a 2G network such as a GSM network. The example wireless network 110 includes two network nodes, a base station system (BSS) 112 and a second base station system 114. The example wireless network 120 includes a base station system 122 and a second base station system 124. A mobile station 102 is being handed over by the BSS 112 of the wireless network 110 to the BSS 122 of the wireless network 120. Connected to both the networks 110 and 120 is a network validation center 130 which is responsible for validating the reliability of the START PS value during the handover process.

In one example embodiment, the BSS 122 receives an inter-RAT signaling message as part of the handover process, the inter-RAT handover information including a START PS value. The START PS value is obtained while the mobile station is inside the example wireless network 110 and may not be reliable for the wireless network 120. The BSS 122 is configured to identify the source of the START PS value, which is the BSS 112, a 3G or 4G network node. Based on the source node information, the BSS creates an inter-RAT handover information value reliability indicator and set the indicator to 0 if the START PS value is not reliable. Alternatively, the BSS 122 may query the mobile station 102 for a new inter-RAT handover information including the START PS value, set the indicator to 1 and include the indicator in a new inter-RAT signaling message to be sent to the next receiving node. In one example embodiment, the indicator is included in a PS-HANDOVER-REQUIRED-PDU message to be included in the new inter-RAT signaling message to be sent to the BSS 124.

In one example embodiment, the BSS 124, upon receiving the inter-RAT signaling message, may check the inter-RAT handover information reliability indicator. If the START PS value is reliable, the BSS 124 may pass it on to the network validation center (NVC) 130. If the indicator indicates that the START PS value is not reliable, the BSS 124 may obtain a new inter-RAT handover information including the START PS value from the mobile station 102 and then pass on the newly acquired START PS value to the network validation center 130 as part of the validation process during the handover process.

Figure 2:
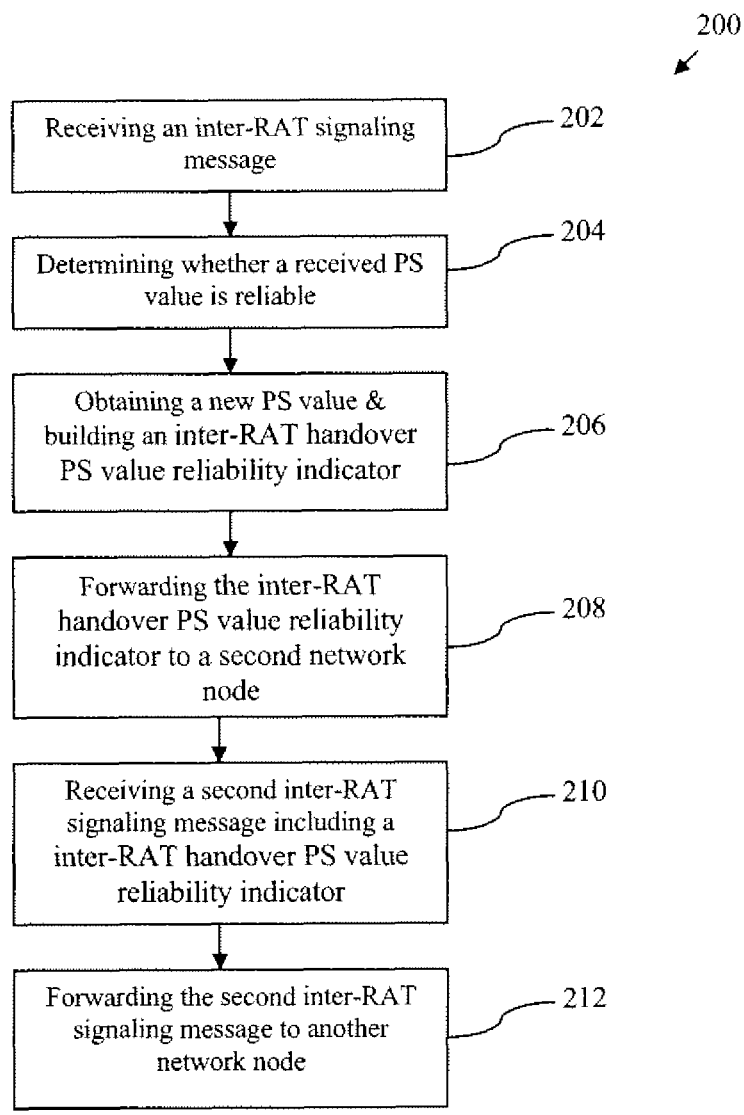
FIG. 2 illustrates an example method for a reliable inter-RAT PS handover.

FIG. 2 illustrates an example method 200 for a reliable inter-RAT PS handover. The method 200 may include receiving an inter-RAT signaling message at block 202 and determining whether a received START PS value is reliable at block 204. The method 200 may also include obtaining a new PS value e and building an inter-RAT handover information reliability indicator at block 206 and forwarding an inter-RAT signaling message including the inter-RAT handover information reliability indicator to a second network node at block 208. The method 200 may also include receiving a second inter-RAT signaling message including an inter-RAT handover information reliability indicator at block 210 and forwarding the second inter-RAT signaling message to a third network node at block 212.

In one example embodiment, receiving the inter-RAT signaling message at block 202 may include receiving a protocol-specific inter-RAT signaling message which may be sent across two different types of radio access networks. One example inter-RAT signaling message is a signaling message sent between a 3G or $4^{th}$ generation (4G) network such as a UMTS or a LTE network and a 2G network such as a GSM network. Receiving the inter-RAT signaling message at block 202 may also include identifying the sender of the inter-RAT signaling message.

In one example embodiment, determining whether a received START PS value is reliable at block 204 may include first determining the type of the source node responsible for sending the inter-RAT signaling message that includes the START PS value. For example, if the source node is a UMTS network node, the receiving node is a 2G network node, the START PS value may be unreliable, at least in part due to the fact that the forwarded START PS values are not generated by the mobile station outside the UMTS network. On the other hand, if the source node is a 2G network node and the receiving node is also a 2G network node, the received START PS value can be reliable provided that the inter-RAT handover information reliability indicator is set to "reliable".

In one example embodiment, obtaining a new START PS value at block 206 may include querying an associated mobile station that is being handed over for a new START PS value. In an alternative embodiment, the new START PS value is not obtained at the same time as the inter-RAT handover information reliability indicator is built and may be obtained later by another network node. Instead, only the inter-RAT handover information reliability indicator is built. In one example, embodiment, building the inter-RAT handover information reliability indicator may include creating an information element reliable inter-RAT handover Info to include the inter-RAT handover information reliability indicator, setting the indicator value to "reliable" or "unreliable" depending on the determination on whether the received START PS value is reliable. In one embodiment, the handover signaling message is a PS-handover-required-protocol data unit (PDU) message sent from a GERAN A/Gb mode base station system to a GERAN A/Gb mode base station system. Alternatively, a BSS-packet flow context (PFC) PDU is built and included in the signaling message.

In one example embodiment, forwarding the inter-RAT handover START PS value reliability indicator at block 208 may include forwarding the signaling message including the inter-RAT handover START PS value reliability indicator to a next target network node, as part of the handover process.

Receiving a second handover signaling message including an inter-RAT handover START PS value reliability indicator at block 210 may include receiving a signaling message from another 2G network node and an inter-RAT handover START PS value reliability indicator included in the signaling may indicate whether the START PS value included in the signaling message is reliable. Depending on whether or not the START PS value received is reliable, the receiving node may obtain a new inter-RAT handover information including the START PS value from the mobile station. Alternatively, the receiving node may forward the signaling message to the next target network node without obtaining a new START PS value.

In one example embodiment, forwarding the second handover signaling message to a third network node at block 212 may include sending the signaling message to another 2G target network node. If the indicator indicates that the START PS value is not reliable, the receiving node may query the associated mobile station for an updated START PS value and send the new START PS value to a network validation center directly or indirectly.

Figure 4:
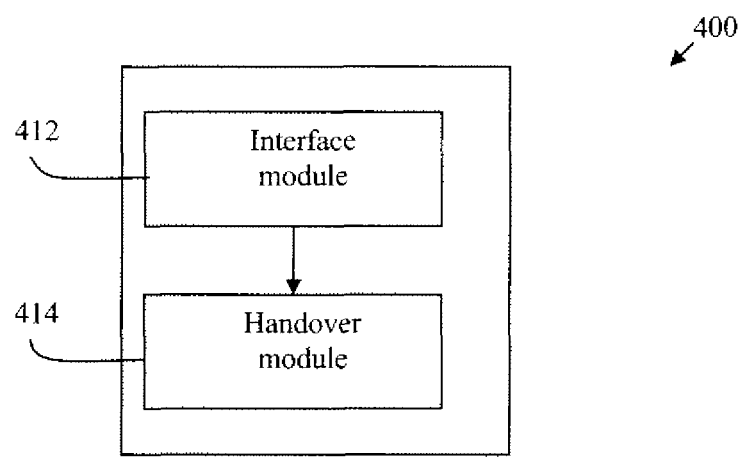
FIG. 4 illustrates an example apparatus for inter-RAT handover with an inter-RAT handover PS reliability indicator.

In one example embodiment, the method 200 is implemented at the network node base station system 120 of FIG. 1 or in the wireless apparatus 400 of FIG. 4. The method 200 is for illustration only and the steps of the method 300 may be combined, divided, or executed in a different order than illustrated, without departing from the scope of the invention of this example embodiment.

Figure 3:
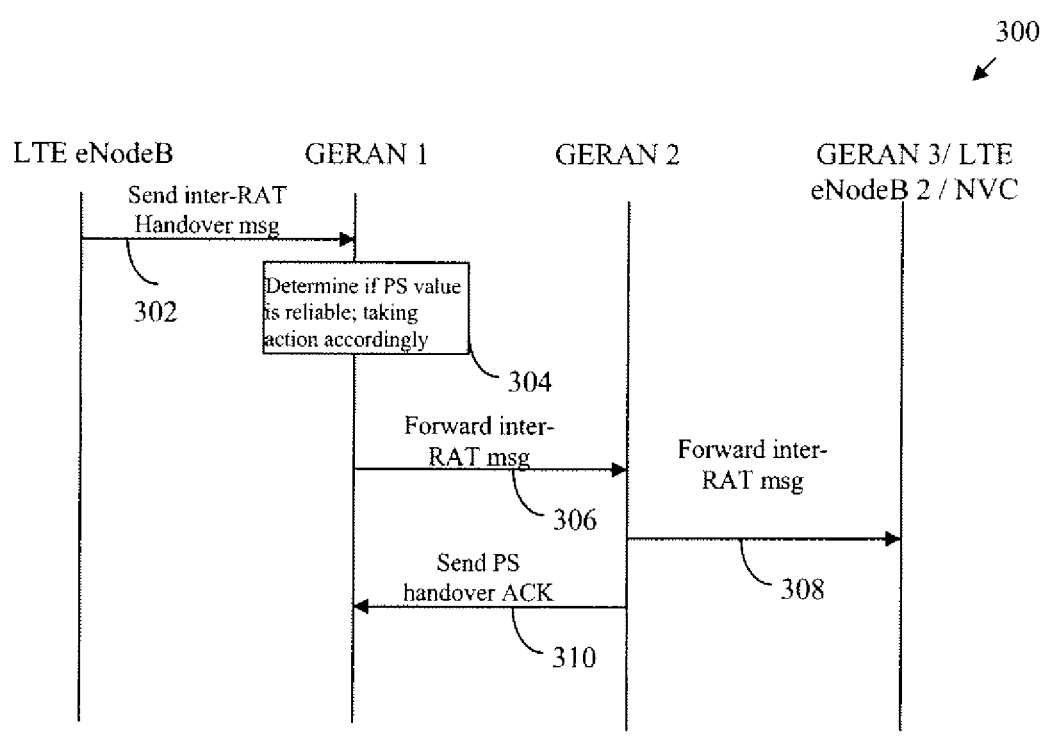
FIG. 3 illustrates an example message flow chart for exchanging START PS value reliability information.

FIG. 3 illustrates an example message flow chart 300 for exchanging START PS value reliability information. The message flow chart 300 may start with a UMTS node sending an inter-RAT handover signaling message at 302. Included in the handover signaling message is a START PS value. A first GSM Edge Radio Access Network (GERAN) node receives the inter-RAT handover signaling message, decodes at least part of the signaling message and determines whether the START PS value is reliable based on the source node type of the signaling message. In this case, the START PS value is not reliable because the source network node of the inter-RAT handover signaling message is a UMTS node. The node GERAN 1 may obtain a new START PS value by querying the associated mobile station, create an inter-RAT handover START PS value reliability indicator and set the value of the indicator to "reliable" since the correct START PS value is obtained. Alternatively, the node GERAN 1 may simply set the indicator to "unreliable" and forward the signaling message to the node GERAN 2. The node GERAN 2 may only forward the signaling message to the next network node at 308, which may be another GERAN node, another LTE node or a network validation center. In addition, the node GERAN2 may send an acknowledgement (ACK) back to the node GERAN1 at 310 to notify its reception of the START PS value.

FIG. 4 illustrates an example apparatus 400 for reliable inter-RAT PS handover with an inter-RAT handover START PS value reliability indicator. In one example embodiment, the apparatus 400 may include an interface module 412 and a handover module 414. The interface module 412 may be configured to receive an inter-RAT signaling message from a source network node, the inter-RAT signaling message including a START PS value. The interface module 412 is also configured to forward the signaling message including a new START PS value and the inter-RAT handover START PS value reliability indicator to a second network node.

In one example embodiment, the handover module 414 may be configured to determine whether a PS value is reliable prior to handing over the associated mobile station to the second network node based on a type of the source node from which the START PS value is received. The handover module 414 may also be configured to obtain a new START PS value and build an inter-RAT handover START PS value reliability indicator if the START PS value is not reliable. The handover module 414 may also be configured to determine whether the START PS value is reliable after identifying the source node of the START PS value and determine that the START PS value is not reliable if the source node is one of a UTMS network node. The START PS value is reliable if it is received from the mobile station in a 2G or LTE wireless network or if the source node is another 2G wireless network node which has set the inter-RAT handover reliability indicator to "reliable." The START PS value is a security parameter exchanged between the mobile station and a network validation center via one or more base station systems. The handover module 414 is further configured to query an associated mobile station for a new START PS value if the inter-RAT handover information reliability indicator indicates that a START PS value is not reliable. In one example embodiment, the inter-RAT handover PS information reliability indicator is a one-bit indicator encoded in a reliable inter-RAT handover information element (IE).

In an example embodiment, the apparatus 400 may be part of a 2G base station system in an A/Gb mode or other equivalent network node. Although FIG. 4 illustrates one example of apparatus 400 for inter-RAT PS handover with an inter-RAT handover information reliability indicator, various changes may be made to the apparatus 400 without departing from the principles of the invention. For example, the handover module 414 may be combined with other modules or further divided into different modules without affecting the effect of the apparatus 400.

Figure 5:
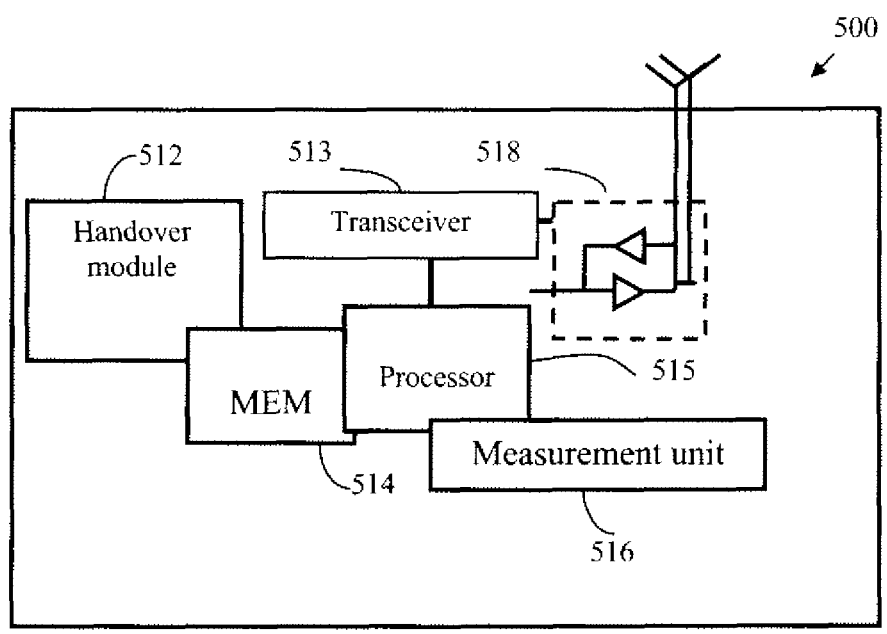
FIG. 5 illustrates an example wireless network apparatus for reliable inter-RAT handover.

FIG. 5 illustrates an example wireless network apparatus for reliable inter-RAT handover. In FIG. 5, the wireless apparatus 500 may include a processor 515, a memory 514 coupled to the processor 515, and a suitable transceiver 513 (having a transmitter (TX) and a receiver (RX)) coupled to the processor 515, coupled to an antenna unit 518. The memory 514 may store programs such as a reliable PS handover module 512. The wireless apparatus 500 may be part of a wireless base station system.

The processor 515 or some other form of generic central processing unit (CPU) or special-purpose processor such as digital signal processor (DSP), may operate to control the various components of the wireless apparatus 500 in accordance with embedded software or firmware stored in memory 514 or stored in memory contained within the processor 515 itself. In addition to the embedded software or firmware, the processor 515 may execute other applications or application modules stored in the memory 514 or made available via wireless network communications. The application software may comprise a compiled set of machine-readable instructions that configures the processor 515 to provide the desired functionality, or the application software may be high-level software instructions to be processed by an interpreter or compiler to indirectly configure the processor 515.

In an example embodiment, the reliable PS handover module 512 may be configured to receive at a first network node an inter-radio access technology (RAT) signaling message from a source network node, the inter-RAT signaling message including a start packet switched (START PS) value and determine whether the START PS value is reliable prior to handing off to a second network node based on the source node from which the START PS value is received and the inter-RAT handover information reliability indicator. The reliable PS handover module 512 may also be configured to obtain an inter-RAT handover START PS value reliability indicator indicating whether the START PS value is reliable and including the inter-RAT handover START PS value reliability indicator in a new inter-RAT signaling message and forward the inter inter-RAT signaling message to a next target network node.

The transceiver 513 is for bidirectional wireless communications with another wireless device. The transceiver 513 may provide frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to some analog baseband processing unit and/or the processor 515 or other central processing unit. In some embodiments, the transceiver 513, portions of the antenna unit 518, and an analog baseband processing unit may be combined in one or more processing units and/or application specific integrated circuits (ASICs).

The antenna unit 518 may be provided to convert between wireless signals and electrical signals, enabling the wireless apparatus 500 to send and receive information from a cellular network or some other available wireless communications network or from a peer wireless device. In an embodiment, the antenna unit 518 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 518 may include antenna tuning and/or impedance matching components, RF power amplifiers, and/or low noise amplifiers.

As shown in FIG. 5, the wireless apparatus 500 may further include a measurement unit 516, which measures the signal strength level that is received from another wireless device, and compare the measurements with a configured threshold. The measurement unit may be utilized by the wireless apparatus 500 in conjunction with various exemplary embodiments of the invention, as described herein.

According to one embodiment, an apparatus comprises means for receiving at a first network node an inter-radio access technology (RAT) signaling message from a source network node, the inter-RAT signaling message including a packet switched (PS) value; means for determining whether the START PS value is reliable prior to handing off to a second network node based on a source node from which the START PS value is received and the inter-RAT handover information reliability indicator; means for generating an inter-RAT handover START PS value reliability indicator indicating whether the START PS value is reliable and including the inter-RAT handover START PS value reliability indicator in a second inter-RAT signaling message; and means for forwarding the second inter-RAT signaling message to the second network node.

Without in any way limiting the scope, interpretation, or application of the claims appearing below, a technical effect of one or more of the example embodiments disclosed herein is reliable inter-RAT handover of START PS value to avoid validation failure when a user roams from one network such as a 3G network to another network such as a 2G network.

Embodiments of the present invention may be implemented in software, hardware, application logic or a combination of software, hardware and application logic. The software, application logic and/or hardware may reside a base station system. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

I claim:

1. A method, comprising
   receiving at a first network node an inter-radio access technology (RAT) signaling message from a source node, the inter-RAT signaling message including inter-RAT handover information including a start packet switched (START-PS) value;
   determining whether the START-PS value is reliable prior to handing over to a target base station at least based in part on the source node from which the START-PS value is received;
   building an inter-RAT handover information reliability indicator to indicate whether the START PS value is reliable and including the inter-RAT handover info reliability indicator in a second inter-RAT signaling message; and
   sending the second inter-RAT signaling message towards the target base station,
   wherein the inter-RAT information reliability indicator is configured as a one bit indicator, and
   wherein the building the inter-RAT information reliability indicator comprises setting the inter-RAT information reliability indicator to one of 0 or 1, depending on whether the START-PS value is reliable.

2. The method of claim 1, wherein the second inter-RAT signaling message is a PS-Handover-Required protocol data unit.

3. The method of claim 1, wherein the inter-RAT handover information reliability indicator is a one-bit indicator encoded in a reliable inter-RAT handover information element (IE) included in the second inter-RAT signaling message.

4. The method of claim 1, wherein the determining whether the START-PS value is reliable prior to handing over to a target base station at least based in part on the source node from which the START PS value is received comprises determining that the START-PS value is received in a message originating from a specific source node type.

5. The method of claim 1, further comprising:
   obtaining a new START-PS value by requesting a new inter-RAT handover information and including the new inter-RAT handover information including a new START-PS value in an inter-RAT signaling message.

6. The method of claim 1, wherein the second inter-RAT signaling message comprises the inter-RAT handover information including the START-PS.

7. A base station, comprising:
at least one processor; and
at least one memory containing computer program code,
wherein the at least one memory and the computer program code are configured to, with the at least one processor, cause the apparatus at least to:
receive an inter-radio access technology (RAT) signaling message from a source node, the inter-RAT signaling message including inter-RAT handover information including a start packet switched (START-PS) value; and
send a second inter-RAT signaling message including an inter-RAT handover information reliability indicator towards a target base station; and
determine whether the START-PS value is reliable prior to handing over to the target base station based at least in part on the source node from which the START-PS value is received; and
build the inter-RAT handover information reliability indicator indicating whether the START-PS value is reliable and include the inter-RAT handover information reliability indicator in the second inter-RAT signaling message,
wherein the inter-RAT information reliability indicator is configured as a one bit indicator, and
wherein building the inter-RAT information reliability indicator comprises setting the inter-RAT information reliability indicator to one of 0 or 1, depending on whether the START-PS value is reliable.

8. The base station of claim 7, wherein the second inter-RAT signaling message is a PS-Handover-Required protocol data unit.

9. The base station of claim 7, wherein the inter-RAT handover information reliability indicator is a one-bit indicator encoded in a reliable inter-RAT handover information element (IE) included in the second inter-RAT signaling message.

10. The base station of claim 7, wherein the at least one memory and the computer program code are configured to, with the at least one processor, cause the apparatus at least to determine whether the START-PS value is reliable prior to handing over to a target base station at least based in part on the source node from which the START-PS value is received by determining that the START-PS value is received in a message originating from a specific source node type.

11. The base station of claim 7, wherein the START-PS value is a security parameter exchanged between an associated mobile station and a network validation center, the associated mobile station in a process of being handed over from the base station to a target base station.

12. The base station of claim 7, wherein the at least one memory and the computer program code are further configured to, with the at least one processor, cause the apparatus at least to obtain a new START-PS value by requesting a new inter-RAT handover information and including the new inter-RAT handover information including a new START-PS value in an inter-RAT signaling message.

13. The base station of claim 7, wherein the second inter-RAT signaling message comprises the inter-RAT handover information including the START-PS.

14. A base station, comprising:
at least one processor; and
at least one memory containing computer program code,
wherein the at least one memory and the computer program code are configured to, with the at least one processor, cause the apparatus at least to:
receive a START packet switched (START-PS) value and an inter-RAT handover information reliability indicator from a source node wherein the START-PS value and the inter-RAT handover information reliability indicator are comprised in an inter-RAT signaling message;
determine whether the inter-RAT handover information reliability indicator in the inter-RAT signaling message indicates the START-PS value in the inter-RAT signaling message to be reliable or unreliable;
send the START-PS in a second message if the inter-RAT handover information reliability indicator indicates that the START-PS value is reliable; and
request a new START-PS value if the inter-RAT handover information reliability indicator indicates that the START-PS value is unreliable;
wherein the inter-RAT information reliability indicator is configured as a one bit indicator, and
wherein determining whether the inter-RAT information reliability indicator indicates the START-PS value to be reliable comprises determining whether the inter-RAT information reliability indicator is set to 1 or to 0 and determining the START-PS to be reliable if the inter-RAT information reliability indicator is set to 1 and determining the START-PS to be unreliable if the inter-RAT information reliability indicator is set to 0.

15. The base station of claim 14 wherein the at least one memory and the computer program code are further configured to, with the at least one processor, cause the apparatus at least to
receive in response to the request the new START-PS value to replace the START-PS value deemed unreliable; and
send the new START-PS value in the second message.

16. The base station of claim 15, wherein the new START-PS is passed from a network node.

17. The base station of claim 15, wherein the new START-PS is requested from a mobile station.

18. The base station of claim 14, wherein the source node is a source base station and the START-PS value is associated with a mobile station to be handed over from the source base station to the base station.

19. The base station of claim 14, wherein the inter-RAT signaling message is a PS-Handover Required packet data unit.

* * * * *